(12) United States Patent
Baynard et al.

(10) Patent No.: US 6,213,441 B1
(45) Date of Patent: Apr. 10, 2001

(54) MOUNT FOR FISHING ROD HOLDERS

(76) Inventors: D. Calvin Baynard, Rte. 7, Box 1444, Manning, SC (US) 29102; David A. Baynard, Rte. 1, Box 1407H, Alcolu, SC (US) 29001

( * ) Notice: Subject to any disclaimer, the term of this patent is extended or adjusted under 35 U.S.C. 154(b) by 0 days.

(21) Appl. No.: 09/346,773

(22) Filed: Jul. 7, 1999

(51) Int. Cl.$^7$ .................................................. A01K 97/12
(52) U.S. Cl. .......................... 248/538; 43/21.2; 248/512; 411/120
(58) Field of Search .................................... 248/538, 535, 248/512, 520; 43/21.2; 411/119, 120

(56) References Cited

U.S. PATENT DOCUMENTS

| | | | |
|---|---|---|---|
| 2,025,004 | * 12/1935 | Shearer | 411/120 |
| 4,471,553 | 9/1984 | Copeland | 43/15 |
| 5,054,737 | * 10/1991 | DeLancey | 43/21.2 X |
| 5,163,652 | 11/1992 | King | 248/538 |
| 5,557,877 | * 9/1996 | Colson | 43/21.2 |
| 5,685,107 | * 11/1997 | Sweet | 43/21.2 |
| 5,855,087 | 1/1999 | Risinger | 43/21.2 |
| 5,954,466 | * 9/1999 | Coffey et al. | 411/119 |
| 5,987,804 | * 11/1999 | Shearer et al. | 43/21.2 |
| 6,007,042 | * 12/1999 | Baynard et al. | 248/535 |

* cited by examiner

Primary Examiner—Ramon O. Ramirez
(74) Attorney, Agent, or Firm—Douglas W. Kim; Cort Flint

(57) ABSTRACT

This invention is a fishing rod holder mount comprising a base unit which can be secured or affixed to a supporting surface such as the upper rail or gunwale of a boat; a shaft which is received by the base unit and therefore secured to the supporting surface; and an interlocking mechanism between the base and shaft which prevents the shaft and therefore the fishing rod holder from rotating about the shaft axis. The fishing rods held by the fishing rod holder are prevented from rotating across the boat or supporting surface. Therefore, the fishing rod is prevented from striking a boat occupant, tangling with other rods or objects, and prevented from complicating reeling in of a fish.

21 Claims, 5 Drawing Sheets

MOUNT FOR FISHING ROD HOLDERS

BACKGROUND OF THE INVENTION

This invention is directed to a mount for a fishing rod holder, and more particularly to a fishing rod holder mount which secures the fishing rod holder to a supporting surface so that the fishing rod holder and rod do not rotate in relation to the supporting surface.

Typically, fishing rod holders have been designed for attachment to the upper rail or gunwale of a boat. Methods of attachment include clamps, mounts to rails, or mounts to flat surfaces. These holders include a vertical support which is secured to a mount affixed to the rail of a boat by means of a threaded attachment. While it is well known in the art to mount a fishing rod holder to the upper rail or gunwale of a boat, these methods do not secure the fishing rod holder so as to prevent rotation of the rod holder. Fishing rod holders hold a rod so that the handle and reel are generally above the boat rail or gunwale. The remaining shaft portion of the rod and the line are held out over the water in an outrigger fashion. Therefore, when a fish hits the line or is hooked, the movement of the fish can rotate the rod around the boat which can tangle the rod with other rods, hit and injury an occupant of the boat, interfere with the operation of the boat, or tangle the line so as to make reeling in the fish substantially more difficult. Additionally, when the boat is trolling, the hook can snag stationary objects which rotates the rod so that the rod crosses the boat and tangles with other rods, or hits and injures an occupant of the boat. Also, when a multiple rod holder is used, rotation of the rods creates significant tangling and drastically complicates reeling in of the fish.

Examples of these prior devices can be found in U.S. Pat. No. 5,855,087 which disclosed a fishing rod holder pivotally mounted on an upper container surface. U.S. Pat. No. 4,471,553 disclosed a fishing rod holder for automatic hook setting that is pivotally mounted onto a pedestal allowing the fishing rod to pivot. U.S. Pat. No. 5,163,652 disclosed a fishing rod holder which is clamped to the gunwale and can be swivelled 360 degrees. None of these prior rod holders prevent the fishing rod holder from rotating relative to the supporting surface or boat rail to prevent the rod from swinging into the boat.

Accordingly, an object of the present invention is to provide a fishing rod holder mount which effectively secures the fishing rod holder to the upper rail or gunwale and prevents rotation of the rod holder about the shaft axis.

Another object of the present invention is to provide a fishing rod holder for holding multiple rods and to prevent rotational movement.

Another object of the present invention is to provide a device for preventing rotation of the rod holder while also allowing for quick removal of the rod holder from the boat.

Another object is to provide for a simple fishing rod holder which resists rotational force placed upon the rod by sources such as a fish, trolling or snagging a generally stationary object.

Another object is to provide for a simple fishing rod holder for multiple fishing rods so that rotational movement is prevented.

Still another object of this invention is to provide a simple interlock which is secured in a locked position to prevent vibrations from loosening the interlock.

SUMMARY OF THE INVENTION

The above objectives are accomplished according to the present invention by providing a fishing rod holder mount comprising a base unit which can be secured or affixed to a supporting surface such as the upper rail or gunwale of a boat; a shaft which is received by the base unit and therefore secured to the supporting surface; and an interlocking mechanism between the base and shaft which prevents the shaft and therefore the fishing rod holder from rotating about the shaft axis.

The base unit is affixed to the supporting surface. The shaft is inserted into the base unit and secured to the base unit as to prevent axial movement. It may be necessary for the shaft to rotate relative to the base unit in order to insert the shaft into the base unit. Thereafter, an interlock is placed between the shaft and the base unit having a locked and unlocked position. In the unlocked position, the shaft may freely rotate and thus can be secured to the base unit. Once secured, the interlock is moved into the locked position and thus prevents the shaft from rotating. Since the fishing rod holders are affixed to the shaft, they in turn do not rotate relative to the base unit and the rods holders resist any rotational force placed upon them.

DESCRIPTION OF THE DRAWINGS

The construction designed to carry out the invention will hereinafter be described, together with other features thereof.

The invention will be more readily understood from a reading of the following specification and by reference to the accompanying drawings where an example of the invention is shown and wherein.

DESCRIPTION OF A PREFERRED EMBODIMENT

Figure 1:
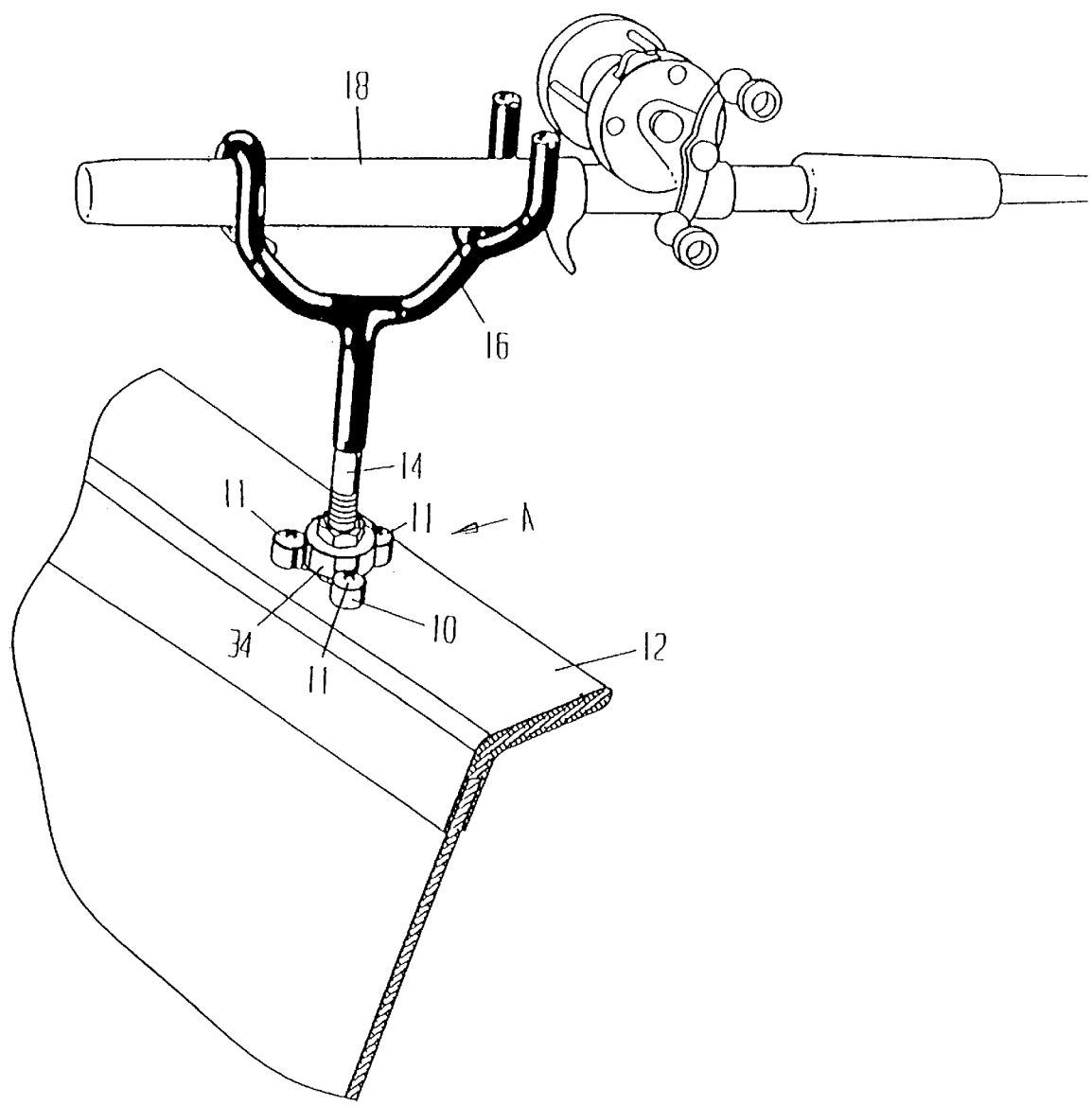
FIG. 1 is a perspective view of the fishing rod mount mounted to the upper rail or gunwale of a boat and a fishing rod holder holding a fishing rod.

Referring now in more detail to the drawings, a fishing rod holder mount according to the invention is illustrated, designated generally as A in FIG. 1. Base unit 10 is secured to gunwale 12 with screws 11. While this method is described for securing the base unit to the boat, those skilled in the art will easily realize that many other methods are available such as, but not limited to, clamps, side mounts, and rail clamps.

Shaft 14 is received by base unit 10 and supports fishing rod holder 16. Fishing rod 18 is placed into fishing rod holder 16 and therefore held securely out over the side of gunwale 12. Locking sleeve 34 interlocks between base unit 10 and shaft 14 to prevent the shaft from rotating relative to the gunwale and also prevents the fishing rod from rotating.

Figure 2:
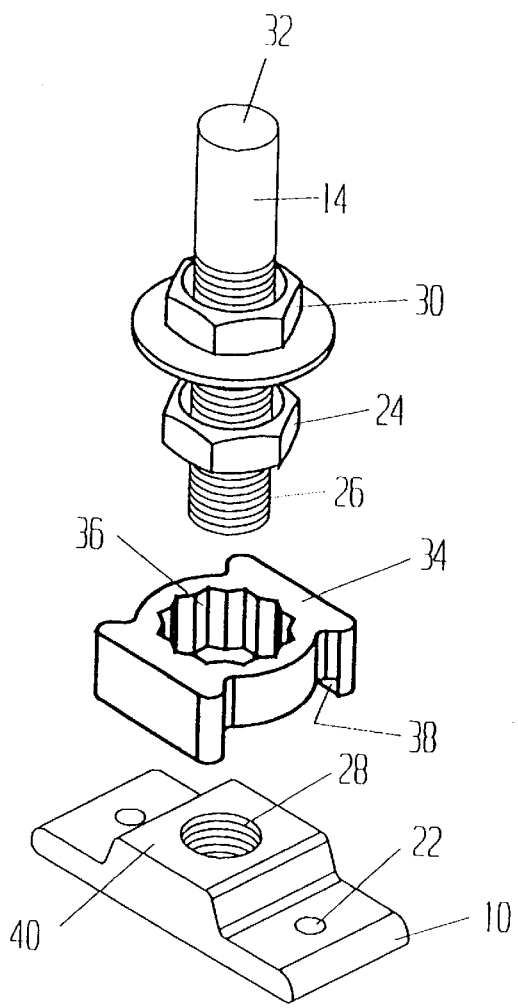
FIG. 2 is a perceptive view of the fishing rod holder mount showing the various parts.

FIG. 2 illustrates the fishing rod holder mount in more detail while omitting the fishing rod holder. In this illustration, base unit 10 has a rectangular configuration. Mounting holes 22 are defined within the base for mounting the base to the upper boat rail or gunwale. Fixed member 24 is affixed to shaft 14 so that threaded portion 26 extends below fixed member 24. Threaded portion 26 is received in threaded opening 28 defined within base unit 10. Securing member 30 surrounds shaft 14 at upperthreaded portion 25 and is disposed between holder end 32 of shaft 14 and fixed member 24. Securing member 30 can travel along shaft 14 by being rotated around upper threaded portion 25. FIG. 2 shows the secured member in a raised position. Locking sleeve 34 has sleeve opening 36 defined within the locking sleeve for receiving fixed member 24. Recess 38 is included within said locking sleeve for receiving abutment 40 of base unit 10.

Figure 3:
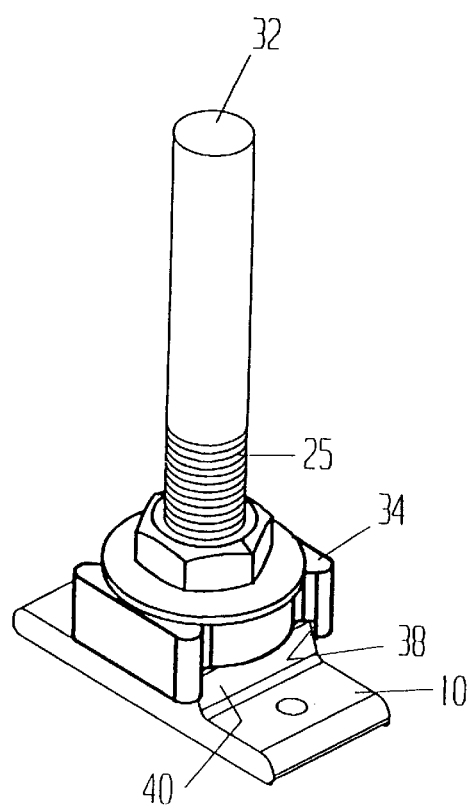
FIG. 3 is a perspective view of a fishing rod holder mount in its locked position.

FIG. 3 shows the fishing rod holder mount in the locked position with the various pieces assembled. Locking sleeve 34 interlocks with abutment 40 of base unit 10 through recess 38. This first interlock prevents the locking sleeve from rotating relative to the base unit. Locking sleeve 34 forms a second interlock with fixed member 24 (FIG. 2) when the outer edges of fixed member 24 (FIG. 2) interlock with sleeve opening 36 (FIG. 2). Sleeve opening 36 (FIG. 2) contain inside edges which engage with the outer edges of fixed member 24 (FIG. 2) to prevent the fixed member and the shaft from rotating relative to the locking sleeve. As shown in FIG. 3, when the first and second interlock are in place, the shaft and therefore the fishing rod holder can not rotate relative to the base unit, the upper boat rail, or a gunwale.

Figure 4:
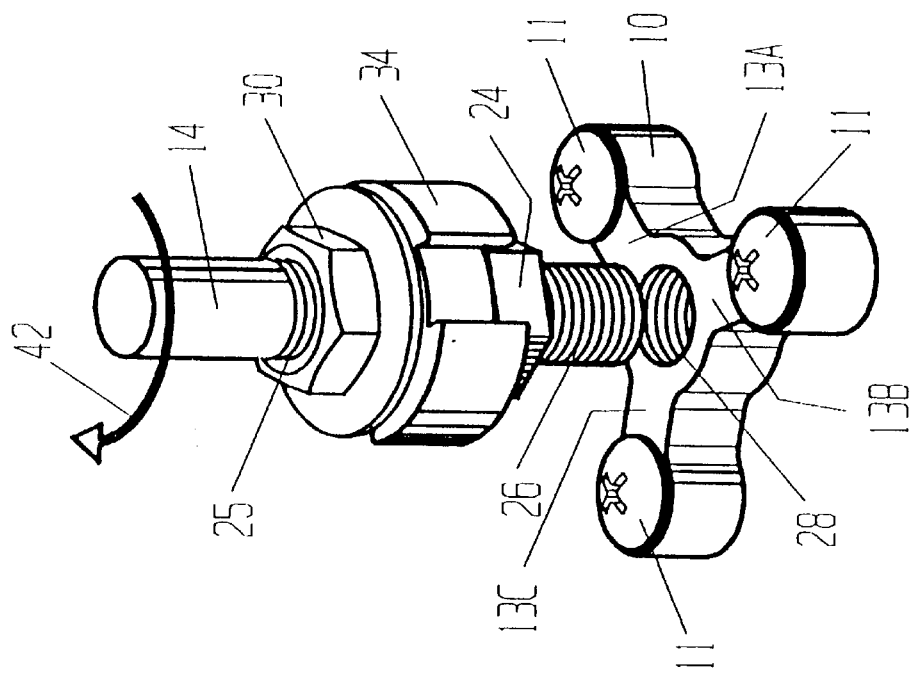
FIG. 4 is a perspective view of a fishing rod holder mount being inserted into the base unit.

FIG. 4 shows a slightly different embodiment of base unit 10. Base unit 10 has three legs 13A, 13B, and 13C radiating outward from the center. Holes are formed at the outward end of these legs for receiving securing screws. Therefore, base unit 10 is secured to a supporting surface such as the upper boat rail or gunwale, by screws 11. Threaded opening 28 receives threaded portion 26 of shaft 14 and secured by turning shaft 14 in the direction shown by arrow 42. Turning the shaft in this direction causes the shaft to be secured into the base unit and prevents axial movement. With locking sleeve 34 placed above the fixed member, the locking sleeve does not interlock with either fixed member 24 nor base unit 10 freely allowing shaft 14 to rotate and to be received into base unit 10. Securing member 30 is positioned on upper threaded portion 25 of shaft 14 so as to allow the locking sleeve to be above fixed member 24.

Figure 5:
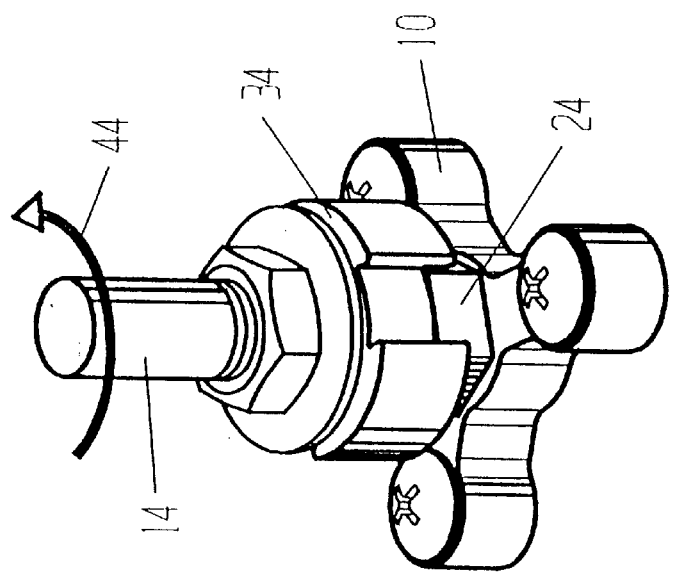
FIG. 5 is a perspective view of a fishing rod holder after it has been inserted into the base unit.

FIG. 5 shows shaft 14 received in base unit 10 and also has locking sleeve 34 in the unlocked position. Fixed member 24 and base unit 10 are not interlocked by locking sleeve 34 so that shaft 14 may freely rotate. This allows shaft 14 to be removed from base unit 10 by rotating shaft 14 in a direction shown by arrow 44. When shaft 14 is rotated in direction 44, the shaft can be removed from the base unit and, therefore, the fishing rod holder can be disengaged from the base unit and stored.

Figure 6:
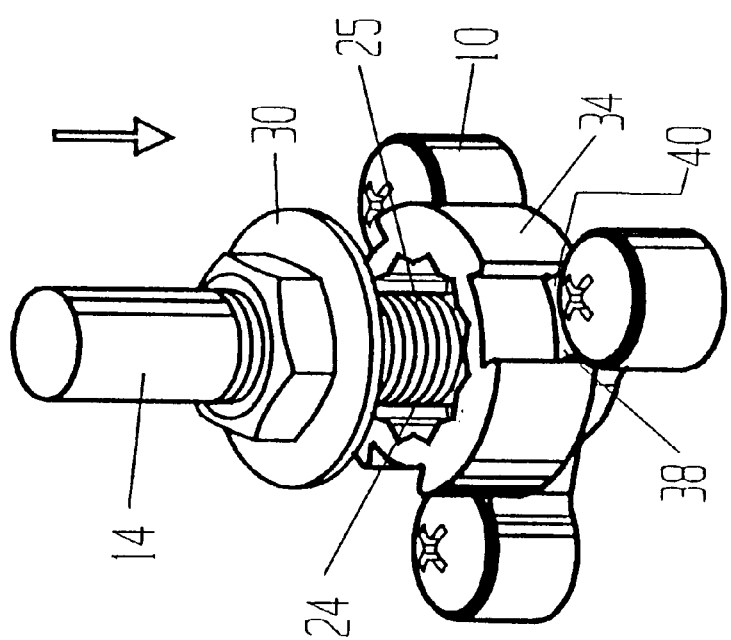
FIG. 6 is a perspective view of a fishing rod holder with the locking sleeve in the locked position without being secured by the securing member.

The interlocks for preventing rotation of shaft 14 can be seem in FIG. 6. Shaft 14 is received into base unit 10 after being screwed in a downward direction. The upper threaded shaft 25 is visible. Locking member 24 is interlocked with locking sleeve 34 forming a first interlock. Recess 38 engages abutment or raised portion 40 is base unit 10 to form a second interlock. The first and second interlock prevent the shaft, the fishing rod holder, and, therefore, the fishing rod from rotating relative to the base unit.

Figure 7:
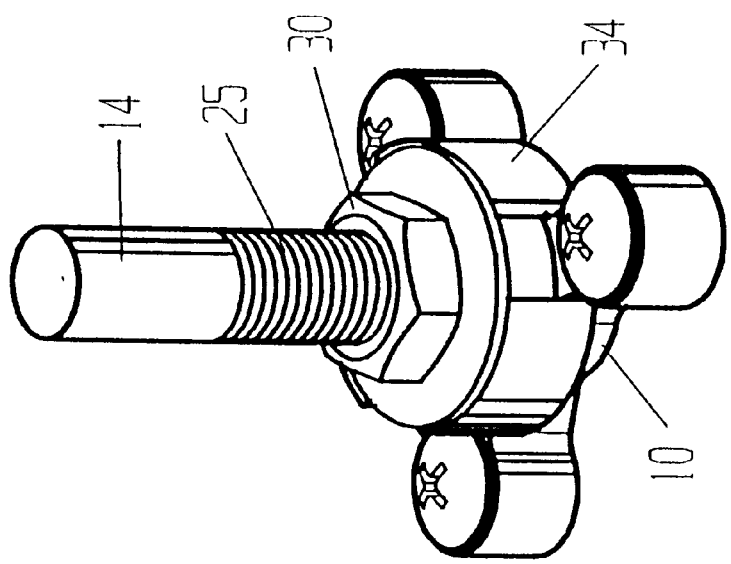
FIG. 7 is a perspective view of a fishing rod holder with the locking sleeve in the locked position secured by the securing member.

FIG. 7 shows the locking sleeve in its locked position with securing member 30 preventing locking sleeve 34 from vibrating upwards. Securing member 30 travels along upper threaded portion 25 of the shaft. When locking sleeve 34 interlocks with the fixed member and the base unit, securing member 30 can be secured against locking sleeve 34 to prevent the locking sleeve from vibrating loose and becoming disengaged. Thus, a secure fishing rod mount which does not allow the fishing rod holder to rotate relative to the base unit is provided.

Figure 8:
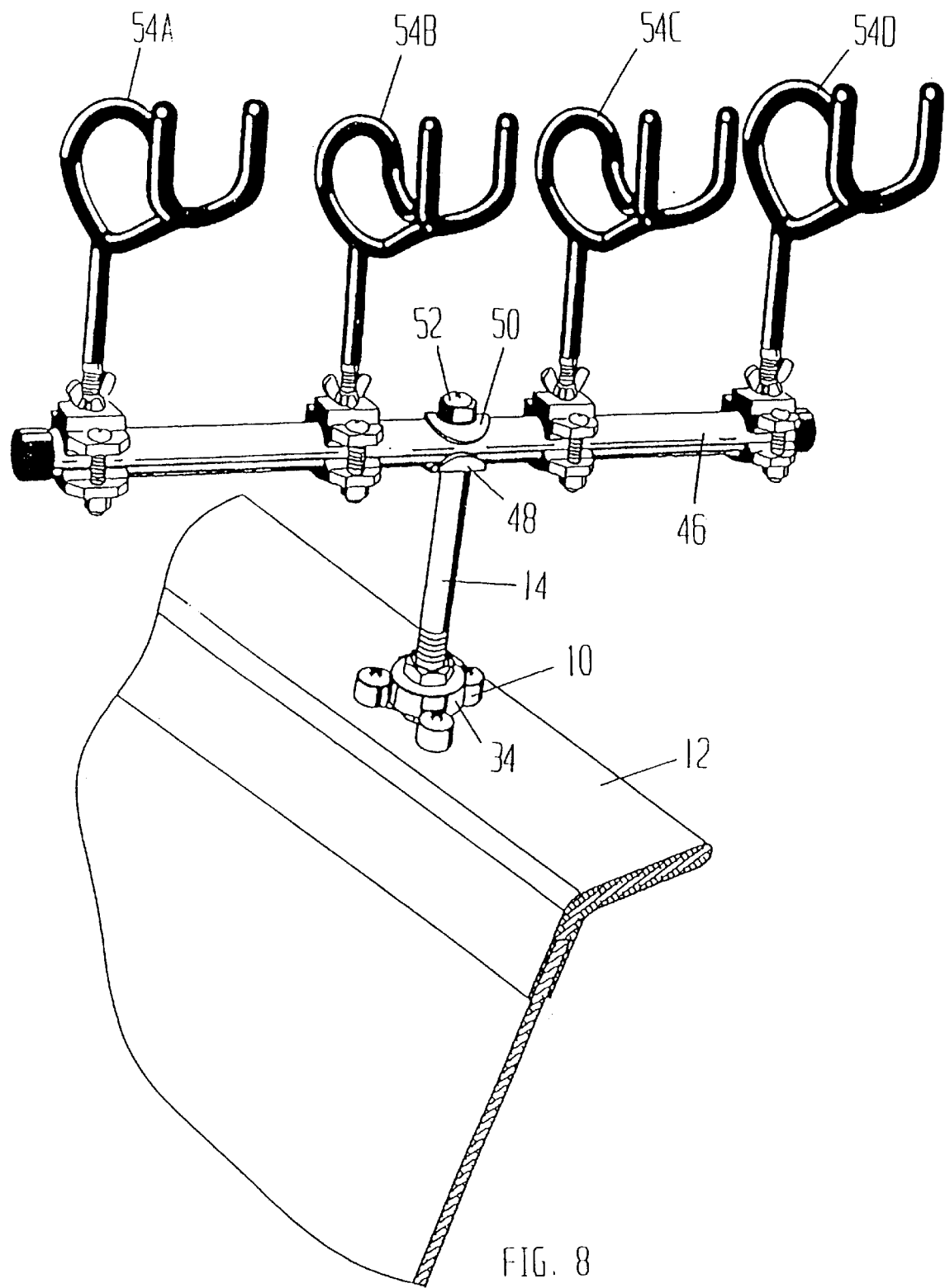
FIG. 8 is a perspective view of the fishing rod holder mount secured to the upper rail of a boat and supporting multiple fishing rod holders.

FIG. 8 illustrates the fishing rod holder mount secured to an upper rail or gunwale of a boat which can support multiple fishing rods. Shaft 14 is shown received into base unit 10 attached to gunwale 12. Transverse bar 46 is carried by shaft 14 and secured by upper member 48, washer 50, and nut 52 so that bar 46 can not rotate separately from shaft 14. Multiple fishing rods holders 54A through 54D are carried by bar 46. Locking sleeve 34 is in the locked position and therefore engaging base unit 10 and the fixed member. Thus, a secure mount for multiple fishing rod holders for preventing rotation relative to the base unit is provided.

From this illustration, it is apparent that rotation of the fishing rod holders is not desirable since the fishing rods would tangle, swing into the boat and potentially hit or injure the occupants, as well as interfering with the boat's operation.

While a preferred embodiment of the invention has been described using specific terms, such description is for illustrative purposes only, and it is to be understood that changes and variations may be made without departing from the spirit or scope of the following claims.

What is claimed is:

1. A fishing rod holder which mounts to a support surface for preventing rotation of a fishing rod in relation to the supporting surface comprising:

a base unit for attachment to the supporting surface;

a shaft detachably carried by said base unit so that said shaft can be removed from said base unit for storage;

said shaft having a holder end;

a fixed member affixed against rotation to said shaft so that said fixed member does not rotate on said shaft;

a shaft portion extending past said fixed member terminating in a free end receivable in said base unit;

a sleeve for being received around said shaft and said fixed member;

said sleeve having an unlocked position upon said shaft wherein said sleeve is not received around said fixed member so that said shaft may freely rotate in relation to said base unit;

said sleeve having a locked position upon said shaft wherein said sleeve is received around said fixed member so that said sleeve forms an interlock between said fixed member and said base unit to prevent said shaft from rotating; and a fishing rod holder carried by said holder end of said shaft so that said fishing rod holder does not rotate when said locking sleeve is in said locked position.

2. The device in claim 1 wherein:

a transverse bar affixed to said holder end of said shaft; and a fishing rod holder detachably carried by said bar.

3. The device of claim 2 further comprising a plurality of fishing rod holders detachable carried by said bar.

4. The device of claim 3 further comprising:

a first interlocking member carried by said base unit;

a second interlocking member carried by said sleeve;

said first interlocking part engaging said second interlocking part when in said locked position so that said shaft does not rotate relative to said base unit.

5. The device of claim 4 further comprising a clamp affixing each of said fishing rod holders to said bar.

6. The device of claim 5 wherein:

said interlock comprises an abutment carried by said base unit;

a recess formed within said sleeve;

said recess being adapted to engage said abutment for preventing said sleeve from rotating in said locked position.

7. The device of claim 6 wherein:

said fixed member having intersecting surfaces along a perimeter of said fixed member;

a sleeve opening defined within said sleeve;

an inner surface of said sleeve opening having intersecting surfaces for engaging corresponding ones of said intersecting surfaces of said fixed member so that said shaft is prevented from rotating relative to said sleeve in said locked position.

8. The device of claim 7 further comprising a plurality of abutments within said base unit for engaging a plurality of recesses within said sleeve.

9. The device of claim 8 wherein said base unit is for mounting to a boat.

10. The device of claim 9 wherein said base unit is for mounting to a rail of a boat.

11. The device of claim 10 wherein said base unit is flush with the rail of the boat.

12. The device of claim 11 wherein a plurality of mounting holes formed within said base unit for mounting said base unit to the supporting surface.

13. A fishing rod holder mount for mounting fishing rod holders to a supporting surface to prevent rotation of a fishing rod relative to the supporting surface comprising:

a base unit for attaching to the supporting surface;

a shaft having a threaded end and a holder end;

a fishing rod holder carried by said holder end;

a fixed member affixed against rotation to said shaft so that said fixed member does not rotate on said shaft;

a threaded portion of said shaft extending past said fixed member terminating in a free end;

a threaded opening formed within said base unit for receiving said threaded portion of said shaft for affixing said shaft to said base unit;

an interlock sleeve for being received around said shaft and said fixed member;

said interlock sleeve having an unlocked position wherein said sleeve is received around said shaft but not received around said fixed member so that said shaft may freely rotate in relation to said base unit; and said interlock sleeve having a locked position wherein said sleeve is received by said shaft and said fixed member so that said sleeve interlocks with said fixed member and said base unit to prevent said shaft from rotating in relation to said base unit so that said fishing rod holder does not rotate relative to said base unit.

14. The device in claim 13 further comprising:

a first rotational direction, said threaded portion of said shaft being threadably received by said base unit when said shaft moves in said first rotational direction, said shaft being received so that said shaft is secured to said base unit;

a second rotational direction opposition to said first rotational direction, said threaded portion of said shaft being removed from said base unit when said shaft moves in said second rotational direction.

15. The device of claim 14 further comprising a fishing rod holder carried by said holder end for holding fishing rods.

16. The device of claim 15 further comprising a plurality of fishing rod holders carried by said holder end.

17. The device of claim 16 further comprising:

an upper threaded portion within said shaft above said fixed member;

a securing member surrounding said upperthreaded portion of said shaft, said securing member disposed between said holder end and said fixed member;

said securing member disposed toward said holder end in said unlocked position so that said interlock sleeve is disposed above said fixed member for allowing said interlock sleeve to disengage from said fixed member;

said securing member disposed adjacent to said sleeve when in said locked position to prevent said sleeve from disengaging from said fixed member and retaining said interlock sleeve in said locked position.

18. A fishing rod holder mount for securing a fishing rod holder to a supporting surface to prevent rotation of the fishing rod in relation to the supporting surface comprising:

a base unit for attachment to the supporting surface;

a shaft detachably carried by said base unit having a lower end and a holder end, said holder end for attachment of a fishing rod holder;

a fixed member affixed against rotation about said shaft carried by said lower end;

an interlock formed between said fixed member and said base unit;

said interlock having a locked position wherein said interlock prevents rotational and axial movement of said fixed member and said shaft relative to said base unit; and said interlock having an unlocked position wherein said fixed member and shaft may freely rotate relative to said base unit and may be detached from said base unit.

19. The device of claim 18 further comprising a securing member for preventing said interlock from disengaging from said locked position.

20. The device of claim 19 further comprising a fishing rod holder carried by said holder end of said shaft.

21. The device of claim 20 further comprising a plurality of fishing rod holders carried by said holder end.

* * * * *